US012561317B2

(12) United States Patent
Sekar et al.

(10) Patent No.: US 12,561,317 B2
(45) Date of Patent: Feb. 24, 2026

(54) UNIFIED CONVERSATIONAL SYSTEM

(71) Applicant: Genesys Cloud Services, Inc., Menlo Park, CA (US)

(72) Inventors: Archana Sekar, Chennai (IN); Joseph Anselm Ambrose, Chennai (IN); Jothiprasath Rajan, Chennai (IN); Sasidharan Dhandapani, Chennai (IN); Praveen Kumar A, Chennai (IN)

(73) Assignee: Genesys Cloud Services, Inc., Menlo Park, CA (US)

( * ) Notice: Subject to any disclaimer, the term of this patent is extended or adjusted under 35 U.S.C. 154(b) by 29 days.

(21) Appl. No.: 18/656,898

(22) Filed: May 7, 2024

(65) Prior Publication Data

US 2025/0348481 A1 Nov. 13, 2025

(51) Int. Cl.
*G06F 16/2452* (2019.01)
*G06F 16/242* (2019.01)
*G06F 40/35* (2020.01)
*H04L 51/02* (2022.01)

(52) U.S. Cl.
CPC ...... *G06F 16/243* (2019.01); *G06F 16/24528* (2019.01); *G06F 40/35* (2020.01); *H04L 51/02* (2013.01)

(58) Field of Classification Search
CPC .............. G06F 16/243–24528; G06F 16/3344
See application file for complete search history.

(56) References Cited

U.S. PATENT DOCUMENTS

2025/0005027 A1* 1/2025 Merchant .............. G06F 16/248

* cited by examiner

*Primary Examiner* — Robert W Beausoliel, Jr.
*Assistant Examiner* — Nirav K Khakhar
(74) *Attorney, Agent, or Firm* — Taft Stettinius & Hollister LLP

(57) ABSTRACT

A method of leveraging a unified conversational system according to an embodiment includes receiving, by the unified conversational system, a query statement from a user made to a chatbot, determining, by the unified conversational system, an intent of the query statement received from the user, preparing, by the unified conversational system, a query for an application service based on the intent of the query statement, sending, by the unified conversational system, the query to the application service via an application programming interface (API) of the application service, receiving, by the unified conversational system, a query response from the application service, and providing, by the unified conversational system, the query response to the user via the chatbot.

20 Claims, 10 Drawing Sheets

500

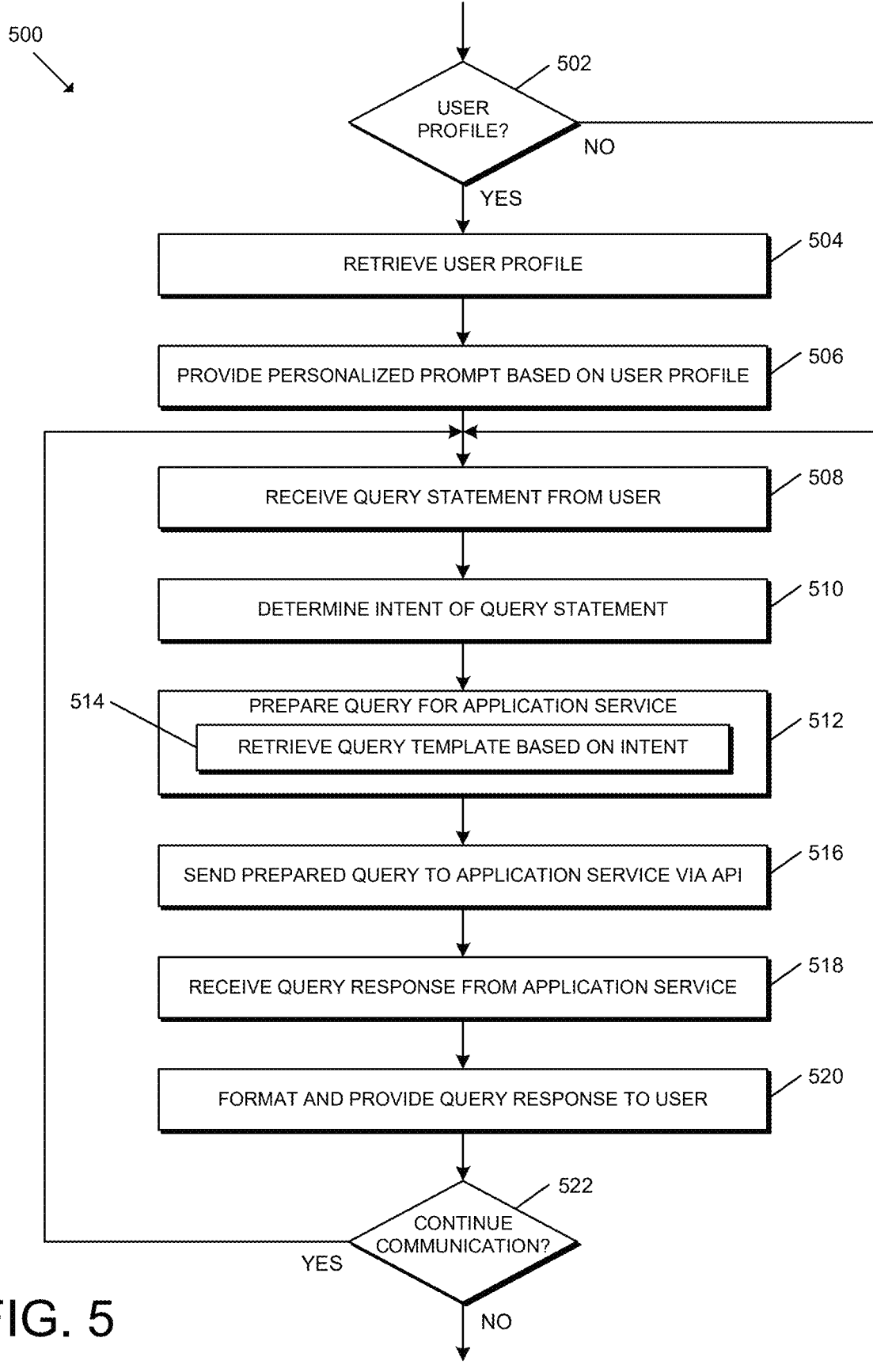

502

USER PROFILE?

NO

YES

RETRIEVE USER PROFILE — 504

PROVIDE PERSONALIZED PROMPT BASED ON USER PROFILE — 506

RECEIVE QUERY STATEMENT FROM USER — 508

DETERMINE INTENT OF QUERY STATEMENT — 510

514

PREPARE QUERY FOR APPLICATION SERVICE — 512
RETRIEVE QUERY TEMPLATE BASED ON INTENT

SEND PREPARED QUERY TO APPLICATION SERVICE VIA API — 516

RECEIVE QUERY RESPONSE FROM APPLICATION SERVICE — 518

FORMAT AND PROVIDE QUERY RESPONSE TO USER — 520

522

CONTINUE COMMUNICATION?

YES

UNIFIED CONVERSATIONAL SYSTEM

BACKGROUND

Engineers use diverse development and operations (DevOps) tools for monitoring and reporting of software applications in different deployments or environments, and are responsible for the uptime and stability of those software applications within an enterprise. Each software application follows its own syntax and has a distinct query language. Therefore, when debugging a software application during an outage, engineers generally must toggle between multiple different tools/platforms and write platform-specific queries, which is tedious and time consuming, often when rapid analysis and stable recovery are paramount concerns.

SUMMARY

One embodiment is directed to a unique system, components, and methods for leveraging a unified conversational system. Other embodiments are directed to apparatuses, systems, devices, hardware, methods, and combinations thereof for leveraging a unified conversational system.

According to an embodiment, a method of leveraging a unified conversational system may include receiving, by the unified conversational system, a query statement from a user made to a chatbot, determining, by the unified conversational system, an intent of the query statement received from the user, preparing, by the unified conversational system, a query for an application service based on the intent of the query statement, sending, by the unified conversational system, the query to the application service via an application programming interface (API) of the application service, receiving, by the unified conversational system, a query response from the application service, and providing, by the unified conversational system, the query response to the user via the chatbot.

In some embodiments, preparing the query for the application service may include retrieving a query template based on the intent of the query statement received from the user.

In some embodiments, the method may further include retrieving, by the unified conversational system, a user profile of the user, and providing, by the unified conversational system, a personalized prompt to the user based on the user profile, wherein the personalized prompt identifies one or more query options related to one or more application services.

In some embodiments, the user profile may store one or more application services frequently accessed by the user, and the personalized prompt may identify data associated with the one or more application services frequently accessed by the user.

In some embodiments, the user profile may store a set of most recent queries by the user, and the personalized prompt may identify the set of more recent queries by the user.

In some embodiments, the application service may be or include a logging service.

In some embodiments, the application service may be or include a metric service.

In some embodiments, the application service may be or include an alerting service.

In some embodiments, the application service may be or include a third party application service external to the unified conversational system.

In some embodiments, the method may further include generating, by the unified conversational system, a notification in response to determining that a particular query has been made at least a threshold number of times to a particular application service for which no data is stored in an associated query file.

According to another embodiment, a computing system for leveraging a unified conversational system may include at least one processor and at least one memory having a plurality of instructions stored thereon that, in response to execution by the at least one processor, causes the computing system to receive, by the unified conversational system, a query statement from a user made to a chatbot, determine, by the unified conversational system, an intent of the query statement received from the user, prepare, by the unified conversational system, a query for an application service based on the intent of the query statement, send, by the unified conversational system, the query to the application service via an application programming interface (API) of the application service, receive, by the unified conversational system, a query response from the application service, and provide, by the unified conversational system, the query response to the user via the chatbot.

In some embodiments, to prepare the query for the application service may include to retrieve a query template based on the intent of the query statement received from the user.

In some embodiments, the plurality of instructions may further cause the computing system to retrieve, by the unified conversational system, a user profile of the user, and provide, by the unified conversational system, a personalized prompt to the user based on the user profile, wherein the personalized prompt identifies one or more query options related to one or more application services.

In some embodiments, the user profile may store one or more application services frequently accessed by the user, and the personalized prompt may identify data associated with the one or more application services frequently accessed by the user.

In some embodiments, the user profile may store a set of most recent queries by the user, and the personalized prompt may identify the set of more recent queries by the user.

In some embodiments, the application service may be or include a logging service.

In some embodiments, the application service may be or include a metric service.

In some embodiments, the application service may be or include an alerting service.

In some embodiments, the application service may be or include a third party application service external to the unified conversational system.

In some embodiments, the plurality of instructions may further cause the computing system to generate, by the unified conversational system, a notification in response to a determination that a particular query has been made at least a threshold number of times to a particular application service for which no data is stored in an associated query file.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

FIG. 5 is a simplified block diagram of at least one embodiment of a method of leveraging a unified conversational system.

DETAILED DESCRIPTION

Figure 1:
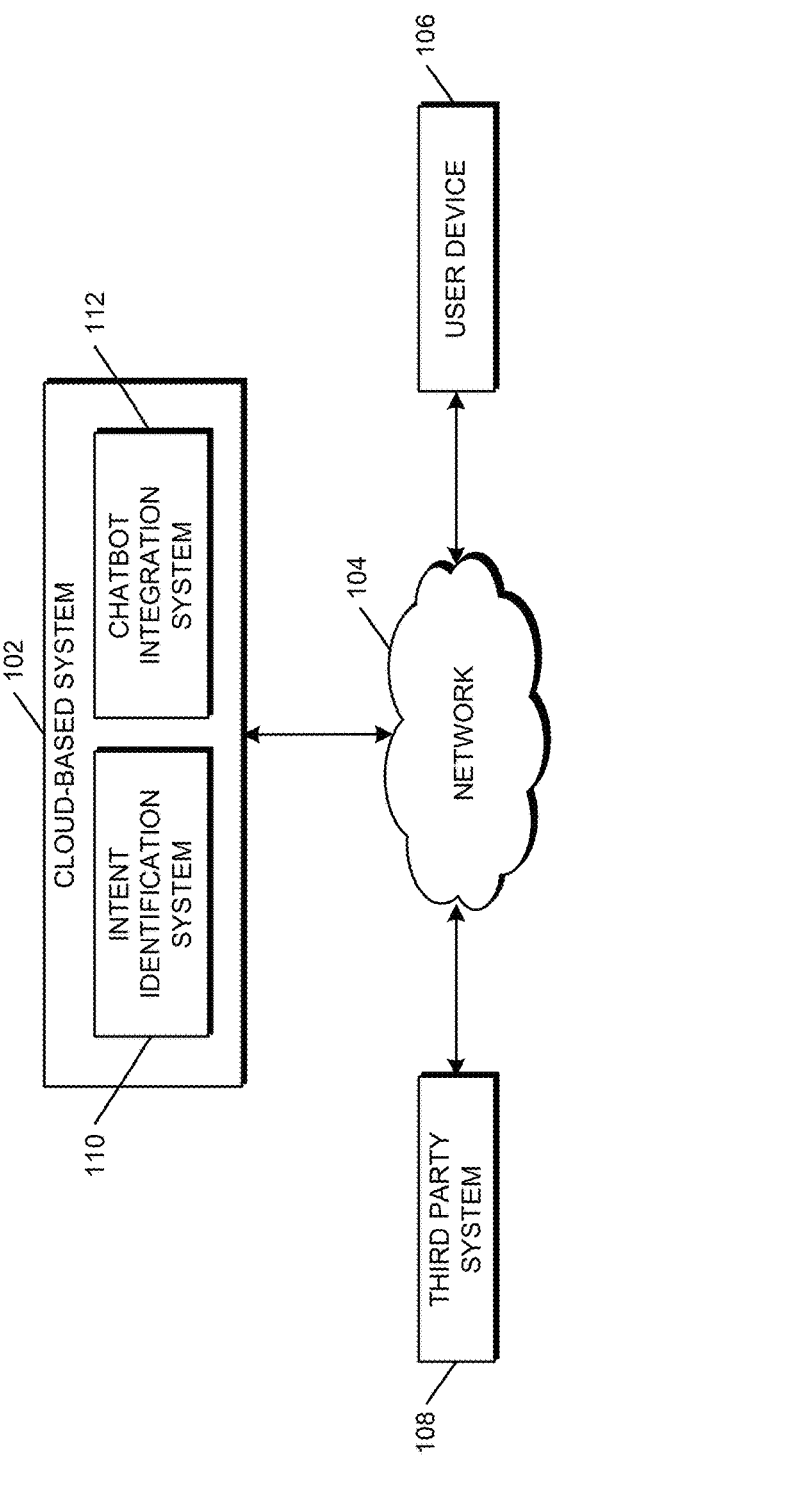
FIG. 1 depicts a simplified block diagram of at least one embodiment of a system for leveraging a unified conversational system.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Further, particular features, structures, or characteristics may be combined in any suitable combinations and/or sub-combinations in various embodiments.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

From a practical standpoint, cloud-based and other software applications aim to minimize possible downtime or functional unavailability, which typically results in continuous monitoring of application services. It is vital for engineers to get useful information related to a potential error causing downtime immediately during an incident. Enterprise-level systems that require monitoring or reporting at a large scale typically utilize tools or applications that solve only a single problem without compromising on the performance relative to the respective tool or application. However, DevOps teams must typically rely on different tools for each use case or query, such as logging, metrics, alerting, pipeline status, and/or other queries. As such, an engineer responsible for managing the uptime of a service may frequently hop into three or more tools and services to analyze, identify, and understand the particular state of an application, with each of those tools having its own syntax and query mechanism. The technologies described herein, however, provide a unified conversational system (e.g., a unified conversational chat interface) that can interact with different monitoring, reporting, and DevOps tools, fetch the information needed for analysis, and render that information in an easily readable or visualized format.

The technologies described herein provide a sophisticated chat-based service by providing integrations with the application services used by the DevOps team (e.g., monitoring/logging services, deployment pipelines, alerting services, metric services, etc.). As such, the technologies provide a layer of abstraction, which allows each user to obtain relevant monitoring data in a user-friendly and visualized format using queries presented in natural language, human-readable text rather than complex queries and inputs to a particular monitoring system. This removes or reduces the need for the engineer to interact with multiple systems via their unique syntax and query mechanisms. The technical improvements described herein yield many technical benefits including, for example, the ability for an engineer to obtain data faster from the relevant destinations (e.g., during a time-sensitive downtime incident) by reducing the amount of time switching, authorizing, and searching for data in different applications; the gathering of all relevant data in a single location (e.g., allowing for better engineering analysis and conclusions); and quicker resolution of an incident (e.g., by reducing the time required to obtain data and by prompt and seamless visualization of relevant data).

Referring now to FIG. 1, a system for leveraging a unified conversational system includes a cloud-based system 102, a network 104, a user device 106, and a third party system 108. Additionally, the illustrative cloud-based system 102 includes a chatbot integration system 110 and a unified conversational system 112. Although only one cloud-based system 102, network 104, user device 106, third party system 108, chatbot integration system 110, and unified conversational system 112 are shown in the illustrative embodiment of FIG. 1, the system 100 may include multiple cloud-based systems 102, networks 104, user devices 106, third party systems 108, chatbot integration systems 110, and/or unified conversational systems 112 in other embodiments. For example, in some embodiments, multiple cloud-based systems 102 (e.g., related or unrelated systems) may be used to perform the various functions described herein. Further, in some embodiments, one or more of the systems described herein may be excluded from the system 100, one or more of the systems described as being independent may form a portion of another system, and/or one or more of the systems described as forming a portion of another system may be independent.

The cloud-based system 102 may be embodied as any one or more types of devices/systems capable of performing the functions described herein. For example, in the illustrative embodiment, the cloud-based system 102 may be leveraged by the unified conversational system 112 to allow a user (of the user device 106) to communicate with a chatbot via the chatbot integration system 110 using natural language to present various queries relevant to application services of one or more internal systems of the cloud-based system 102 and/or applications services of one or more third party systems 108. As described herein, in some embodiments, the chatbot integration system 110 may be similar to the chatbot integration system 222 of FIG. 2 and/or the chatbot integration system 404 of FIG. 4. Similarly, the unified conversational system 112 may be similar to the unified conversational system 224 of FIG. 2 and/or the unified conversational system 406 of FIG. 4. Although the cloud-based system 102 is described herein in the singular, it should be appreciated that the cloud-based system 102 may be embodied as or include multiple servers/systems in some embodiments. Further, although the cloud-based system 102 is described herein as a cloud-based system, it should be appreciated that the system 102 may be embodied as one or more servers/systems residing outside of a cloud computing environment in other embodiments. In cloud-based embodiments, the cloud-based system 102 may be embodied as a server-ambiguous computing solution similar to that described below.

The network 104 may be embodied as any one or more types of communication networks that are capable of facilitating communication between the various devices communicatively connected via the network 104. As such, the network 104 may include one or more networks, routers, switches, access points, hubs, computers, and/or other intervening network devices. For example, the network 104 may be embodied as or otherwise include one or more cellular networks, telephone networks, local or wide area networks, publicly available global networks (e.g., the Internet), ad hoc networks, short-range communication links, or a combination thereof. In some embodiments, the network 104 may include a circuit-switched voice or data network, a packet-switched voice or data network, and/or any other network able to carry voice and/or data. In particular, in some embodiments, the network 104 may include Internet Protocol (IP)-based and/or asynchronous transfer mode (ATM)-based networks. In some embodiments, the network 104 may handle voice traffic (e.g., via a Voice over IP (VOIP) network), web traffic (e.g., such as hypertext transfer protocol (HTTP) traffic and hypertext markup language (HTML) traffic), and/or other network traffic depending on the particular embodiment and/or devices of the system 100 in communication with one another. In various embodiments, the network 104 may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. The network 104 may enable connections between the various devices/systems 102, 106, 108, 110, 112 of the system 100. It should be appreciated that the various devices/systems 102, 106, 108, 110, 112 may communicate with one another via different networks 104 depending on the source and/or destination devices/systems 102, 106, 108, 110, 112.

The user device 106 may be embodied as any type of device (e.g., of an engineer assigned to a DevOps team of an enterprise) capable of executing an application and otherwise performing the functions described herein. For example, in some embodiments, the user device 106 is configured to execute an application to participate in a conversation with a chatbot, personal bot, automated agent, or other automated system. As such, the user device 106 may have various input/output devices with which a user may interact to provide and receive audio, text, video, and/or other forms of data. It should be appreciated that the application may be embodied as any type of application suitable for performing the functions described herein. In particular, in some embodiments, the application may be embodied as a mobile application (e.g., a smartphone application), a cloud-based application, a web application, a thin-client application, and/or another type of application. For example, in some embodiments, application may serve as a client-side interface (e.g., via a web browser) for a web-based application or service.

The third party system 108 may be embodied as any type of device or system capable of performing the functions described herein. For example, in the illustrative embodiment, the third party system 108 includes one or more application services that may be integrated with the unified conversational system 112 in order to be seamlessly accessed by the user of the user device 106 (e.g., using natural language chat with a chatbot as discussed below). For example, some application services may include logging services, metric services, deployment/pipeline services, alerting services, and/or other application services. As indicated above, it should be appreciated that the system 100 may include multiple third party systems 108 in some embodiments. Further, each of the third party systems 108 may include an application programming interface (API) and/or software development kit (SDK) that may be leveraged by the unified conversational system 112 to interact with and/or present queries to the respective application services of that third party system 108. As indicated above, in some embodiments, the unified conversational system 112 may also be integrated with application services internal to the cloud-based system 102, in which case the cloud-based system 102 may leverage an API and/or SDK associated with those internal application services for interaction therewith.

Figure 2:
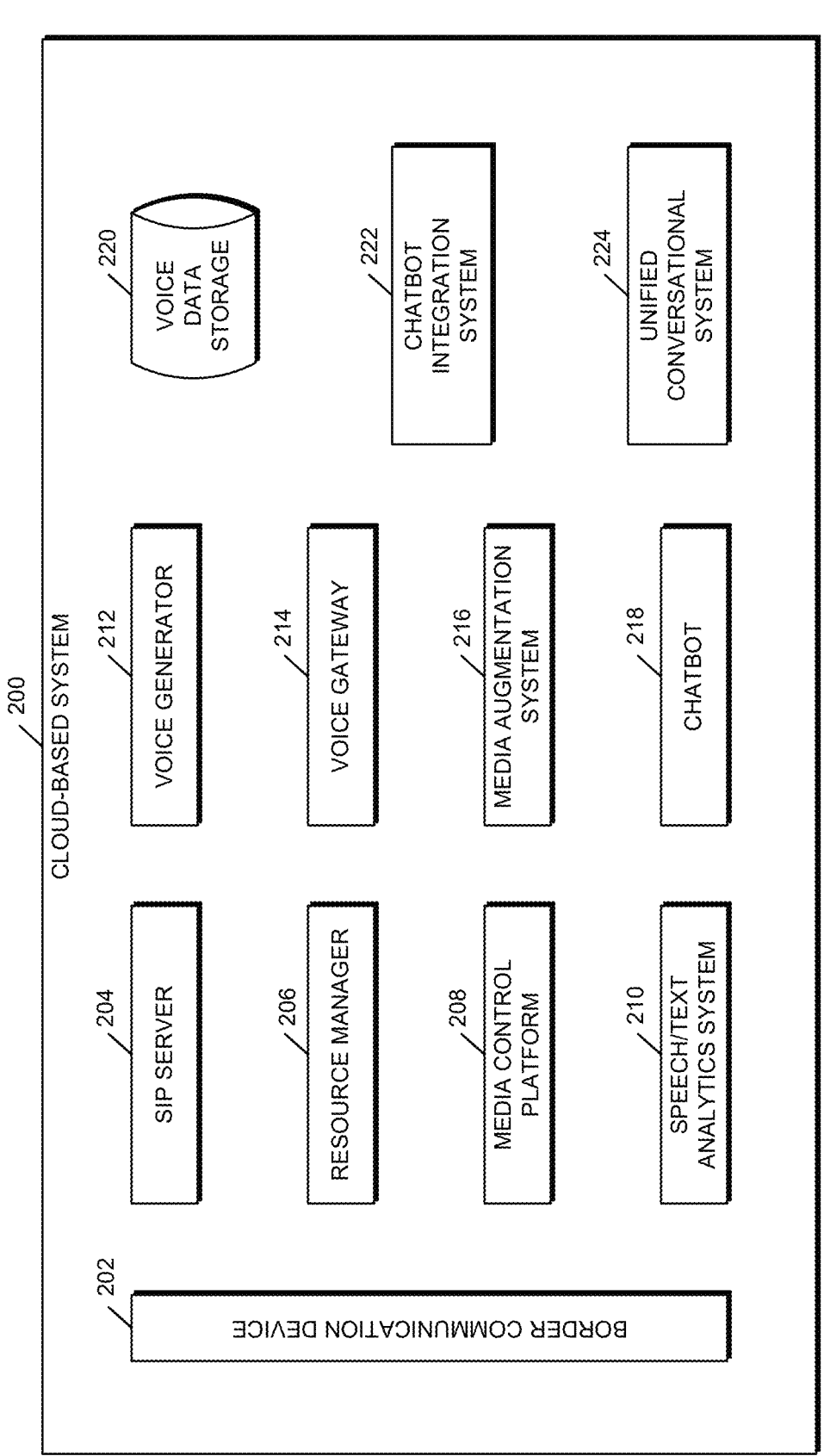
FIG. 2 is a simplified block diagram of at least one embodiment of a cloud-based system.
Figure 3:
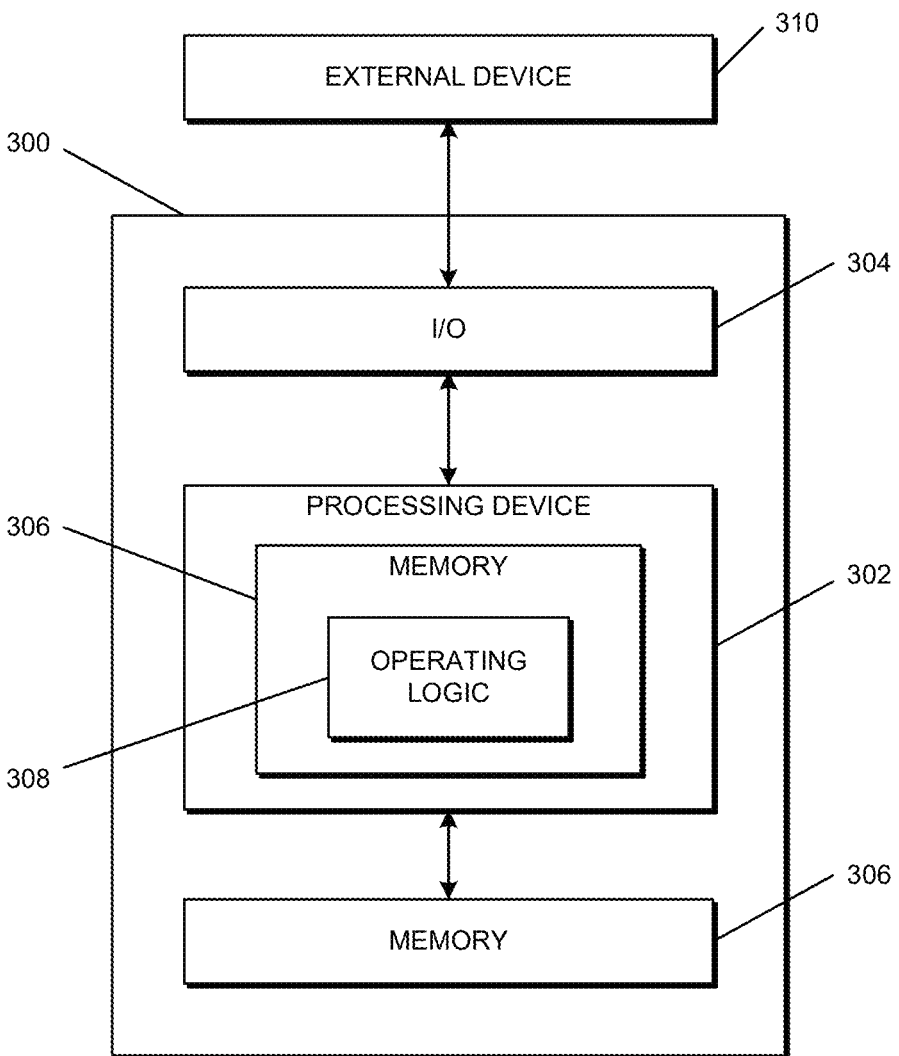
FIG. 3 is a simplified block diagram of at least one embodiment of a computing device.

It should be appreciated that each of the cloud-based system 102, the network 104, the user device 106, and the third party system 108 may be embodied as, executed by, form a portion of, or associated with any type of device/system, collection of devices/systems, and/or portion(s) thereof suitable for performing the functions described herein (e.g., the computing device 300 of FIG. 3). In various embodiments, it should be appreciated that the cloud-based system 102 may form a portion of, constitute a feature/device superset of, or involve a cloud-based system similar to the cloud-based system 200 of FIG. 2.

Referring now to FIG. 2, a simplified block diagram of at least one embodiment of a cloud-based system 200 is shown. The illustrative cloud-based system 200 includes a border communication device 202, a SIP server 204, a resource manager 206, a media control platform 208, a speech/text analytics system 210, a voice generator 212, a voice gateway 214, a media augmentation system 216, a chatbot 218, voice data storage 220, a chatbot integration system 222, and a unified conversational system 224. Although only one border communication device 202, one SIP server 204, one resource manager 206, one media control platform 208, one speech/text analytics system 210, one voice generator 212, one voice gateway 214, one media augmentation system 216, one chatbot 218, one voice data storage 220, one chatbot integration system 222, and one unified conversational system 224 are shown in the illustrative embodiment of FIG. 2, the cloud-based system 200 may include multiple border communication devices 202, SIP servers 204, resource managers 206, media control platforms 208, speech/text analytics systems 210, voice generators 212, voice gateways 214, media augmentation systems 216, chatbots 218, voice data storages 220, chatbot integration systems 222, and/or unified conversational systems 224 in other embodiments. For example, in some embodiments, multiple chatbots 218 may be used to communicate regarding different subject matters handled by the same cloud-based system 200. Further, in some embodiments, one or more of the components described herein may be excluded from the system 200, one or more of the components described as being independent may form a portion of another component, and/or one or more of the components described as forming a portion of another component may be independent.

The border communication device 202 may be embodied as any one or more types of devices/systems that are capable of performing the functions described herein. For example, in some embodiments, the border communication device 202 may be configured to control signaling and media streams involved in setting up, conducting, and tearing down voice conversations and other media communications between, for example, an end user and contact center system. In some embodiments, the border communication device 202 may be a session border controller (SBC) controlling the signaling and media exchanged during a media session (also referred to as a "call," "telephony call," or "communication session") between the end user and contact center system. In some embodiments, the signaling exchanged during a media session may include SIP, H.323, Media Gateway Control Protocol (MGCP), and/or any other voice-over IP (VOIP) call signaling protocols. The media exchanged during a media session may include media streams that carry the call's audio, video, or other data along with information of call statistics and quality.

In some embodiments, the border communication device 202 may operate according to a standard SIP back-to-back user agent (B2BUA) configuration. In this regard, the border communication device 202 may be inserted in the signaling and media paths established between a calling and called parties in a VoIP call. In some embodiments, it should be understood that other intermediary software and/or hardware devices may be invoked in establishing the signaling and/or media paths between the calling and called parties.

In some embodiments, the border communication device 202 may exert control over signaling (e.g., SIP messages) and media streams (e.g., RTP data) routed to and from a contact center system and other devices that traverse the network (e.g., the network 104). In this regard, the border communication device 202 may be coupled to trunks that carry signals and media for calls to and from the user device over the network, and to trunks that carry signals and media to and from the contact center system over the network.

The SIP server 204 may be embodied as any one or more types of devices/systems that are capable of performing the functions described herein. For example, in some embodiments, the SIP server 204 may act as a SIP B2UBA and may control the flow of SIP requests and responses between SIP endpoints. Any other controller configured to set up and tear down VoIP communication sessions may be contemplated in addition to or in lieu of the SIP server 204 in other embodiments. The SIP server 204 may be a separate logical component or may be combined with the resource manager 206. In some embodiments, the SIP server 204 may be hosted at a contact center system. Although a SIP server 204 is used in the illustrative embodiment, another call server configured with another VoIP protocol may be used in addition to or in lieu of SIP, such as, for example, H.232 protocol, Media Gateway Control Protocol, Skype protocol, and/or other suitable technologies in other embodiments.

The resource manager 206 may be embodied as any one or more types of devices/systems that are capable of performing the functions described herein. In the illustrative embodiment, the resource manager 206 may be configured to allocate and monitor a pool of media control platforms for providing load balancing and high availability for each resource type. In some embodiments, the resource manager 206 may monitor and may select a media control platform 208 from a cluster of available platforms. The selection of the media control platform 208 may be dynamic, for example, based on identification of a location of a calling end user, type of media services to be rendered, detected quality of a current media service, and/or other factors.

In some embodiments, the resource manager 206 may be configured to process requests for media services, and interact with, for example, a configuration server having a configuration database, to determine an interactive voice response (IVR) profile, voice application (e.g. Voice Extensible Markup Language (Voice XML) application), announcement, and conference application, resource, and service profile that can deliver the service, such as, for example, a media control platform. According to some embodiments, the resource manager may provide hierarchical multi-tenant configurations for service providers, enabling them to apportion a select number of resources for each tenant.

In some embodiments, the resource manager 206 may be configured to act as a SIP proxy, a SIP registrar, and/or a SIP notifier. In this regard, the resource manager 206 may act as a proxy for SIP traffic between two SIP components. As a SIP registrar, the resource manager 206 may accept registration of various resources via, for example, SIP REGISTER messages. In this manner, the cloud-based system 200 may support transparent relocation of call-processing components. In some embodiments, components such as the media control platform 208 do not register with the resource manager 206 at startup. The resource manager 206 may detect instances of the media control platform 208 through configuration information retrieved from the configuration database. If the media control platform 208 has been configured for monitoring, the resource manager 206 may monitor resource health by using, for example, SIP OPTIONS messages. In some embodiments, to determine whether the resources in the group are alive, the resource manager 206 may periodically send SIP OPTIONS messages to each media control platform 208 resource in the group. If the resource manager 206 receives an OK response, the resources are considered alive. It should be appreciated that the resource manager 206 may be configured to perform other various functions, which have been omitted for brevity of the description. The resource manager 206 and the media control platform 208 may collectively be referred to as a media controller.

In some embodiments, the resource manager 206 may act as a SIP notifier by accepting, for example, SIP SUBSCRIBE requests from the SIP server 204 and maintaining multiple independent subscriptions for the same or different SIP devices. The subscription notices are targeted for the tenants that are managed by the resource manager 206. In this role, the resource manager 206 may periodically generate SIP NOTIFY requests to subscribers (or tenants) about port usage and the number of available ports. The resource manager 206 may support multi-tenancy by sending notifications that contain the tenant name and the current status (in-or out-of-service) of the media control platform 208 that is associated with the tenant, as well as current capacity for the tenant.

The media control platform 208 may be embodied as any service or system capable of providing media services and otherwise performing the functions described herein. For example, in some embodiments, the media control platform 208 may be configured to provide call and media services upon request from a service user. Such services may include, without limitation, initiating outbound calls, playing music or providing other media while a call is placed on hold, call recording, conferencing, call progress detection, playing audio/video prompts during a customer self-service session, and/or other call and media services. One or more of the services may be defined by voice applications (e.g., VoiceXML applications) that are executed as part of the process of establishing a media session between the media control platform 208 and the end user.

The speech/text analytics system (STAS) 210 may be embodied as any service or system capable of providing various speech analytics and text processing functionalities (e.g., text-to-speech) as will be understood by a person of skill in the art and otherwise performing the functions described herein. The speech/text analytics system 210 may perform automatic speech and/or text recognition and grammar matching for end user communications sessions that are handled by the cloud-based system 200. The speech/text analytics system 210 may include one or more processors and instructions stored in machine-readable media that are executed by the processors to perform various operations. In some embodiments, the machine-readable media may include non-transitory storage media, such as hard disks and hardware memory systems.

The voice generator 212 may be embodied as any service or system capable of generating a voice communication and otherwise performing the functions described herein. In some embodiments, the voice generator 212 may generate the voice communication based on a particular voice signature.

The voice gateway 214 may be embodied as any service or system capable of performing the functions described herein. In the illustrative embodiment, the voice gateway 214 receives end user calls from or places calls to voice communications devices, such as an end user device, and responds to the calls in accordance with a voice program that corresponds to a communication routing configuration of the contact center system. In some embodiments, the voice program may include a voice avatar. The voice program may be accessed from local memory within the voice gateway 214 or from other storage media in the cloud-based system 200. In some embodiments, the voice gateway 214 may process voice programs that are script-based voice applications. The voice program, therefore, may be a script written in a scripting language, such as voice extensible markup language (VoiceXML) or speech application language tags (SALT). The cloud-based system 200 may also communicate with the voice data storage 220 to read and/or write user interaction data (e.g., state variables for a data communications session) in a shared memory space.

The media augmentation system 216 may be embodied as any service or system capable of specifying how the portions of the cloud-based system 200 (e.g., one or more of the border communications device 202, the SIP server 204, the resource manager 206, the media control platform 208, the speech/text analytics system 210, the voice generator 212, the voice gateway 214, the media augmentation system 216, the chatbot 218, the voice data storage 220, the chatbot integration system 222, the unified conversational system 224, and/or one or more portions thereof) interact with each other and otherwise performing the functions described herein. In some embodiments, the media augmentation system 216 may be embodied as or include an application program interface (API). In some embodiments, the media augmentation system 216 enables integration of differing parameters and/or protocols that are used with various planned application and media types utilized within the cloud-based system 200.

The chatbot 218 may be embodied as any automated service or system capable of using automation to engage with end users and otherwise performing the functions described herein. For example, in some embodiments, the chatbot 218 may operate, for example, as an executable program that can be launched according to demand for the particular chatbot. In some embodiments, the chatbot 218 simulates and processes human conversation (either written or spoken), allowing humans to interact with digital devices as if the humans were communicating with another human. In some embodiments, the chatbot 218 may be as simple as rudimentary programs that answer a simple query with a single-line response, or as sophisticated as digital assistants that learn and evolve to deliver increasing levels of personalization as they gather and process information. In some embodiments, the chatbot 218 includes and/or leverages artificial intelligence, adaptive learning, bots, cognitive computing, and/or other automation technologies. Chatbot 218 may also be referred to herein as one or more chat robots, AI chatbots, automated chat robot, chatterbots, dialog systems, conversational agents, automated chat resources, and/or bots.

A benefit of utilizing automated chat robots for engaging in chat conversations with end users may be that it helps contact centers to more efficiently use valuable and costly resources like human resources, while maintaining end user satisfaction. For example, chat robots may be invoked to initially handle chat conversations without a human end user knowing that it is conversing with a robot. The chat conversation may be escalated to a human resource if and when appropriate. Thus, human resources need not be unnecessarily tied up in handling simple requests and may instead be more effectively used to handle more complex requests or to monitor the progress of many different automated communications at the same time.

The voice data storage 220 may be embodied as one or more databases, data structures, and/or data storage devices capable of storing data in the cloud-based system 200 or otherwise facilitating the storage of such data for the cloud-based system 200. For example, in some embodiments, the voice data storage 220 may include one or more cloud storage buckets. In other embodiments, it should be appreciated that the voice data storage 220 may, additionally or alternatively, include other types of voice data storage mechanisms that allow for dynamic scaling of the amount of data storage available to the cloud-based system 200. In some embodiments, the voice data storage 220 may store scripts (e.g., pre-programmed scripts or otherwise). Although the voice data storage 220 is described herein as data storages and databases, it should be appreciated that the voice data storage 220 may include both a database (or other type of organized collection of data and structures) and data storage for the actual storage of the underlying data. The voice data storage 220 may store various data useful for performing the functions described herein.

The chatbot integration system 222 may be embodied as any device or collection of devices capable of performing the functions escribed herein. For example, in some embodiments, the chatbot integration system 222 may be embodied as a system similar to the chatbot integration system 404 of FIG. 4.

The unified conversational system 224 may be embodied as any device or collection of devices capable of performing the functions escribed herein. For example, in some embodiments, the unified conversational system 224 may be embodied as a system similar to the unified conversational system 406 of FIG. 4.

Referring now to FIG. 3, a simplified block diagram of at least one embodiment of a computing device 300 is shown. The illustrative computing device 300 depicts at least one embodiment of each of the computing devices, systems, servicers, controllers, switches, gateways, engines, modules, and/or computing components described herein (e.g., which collectively may be referred to interchangeably as computing devices, servers, or modules for brevity of the description). For example, the various computing devices may be a process or thread running on one or more processors of one or more computing devices 300, which may be executing computer program instructions and interacting with other system modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described herein—such as the cloud-based system 200 of FIG. 2—the various servers and computer devices thereof may be located on local computing devices 300 (e.g., on-site at the same physical location as the agents of the contact center), remote computing devices 300 (e.g., off-site or in a cloud-based or cloud computing environment, for example, in a remote data center connected via a network), or some combination thereof. In some embodiments, functionality provided by servers located on computing devices off-site may be accessed and provided over a virtual private network (VPN), as if such servers were on-site, or the functionality may be provided using a software as a service (SaaS) accessed over the Internet using various protocols, such as by exchanging data via extensible markup language (XML), JSON, and/or the functionality may be otherwise accessed/leveraged.

In some embodiments, the computing device 300 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 300 includes a processing device 302 that executes algorithms and/or processes data in accordance with operating logic 308, an input/output device 304 that enables communication between the computing device 300 and one or more external devices 310, and memory 306 which stores, for example, data received from the external device 310 via the input/output device 304.

The input/output device 304 allows the computing device 300 to communicate with the external device 310. For example, the input/output device 304 may include a transceiver, a network adapter, a network card, an interface, one or more communication ports (e.g., a USB port, serial port, parallel port, an analog port, a digital port, VGA, DVI, HDMI, Fire Wire, CAT 5, or any other type of communication port or interface), and/or other communication circuitry. Communication circuitry of the computing device 300 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 300. The input/output device 304 may include hardware, software, and/or firmware suitable for performing the techniques described herein.

The external device 310 may be any type of device that allows data to be inputted or outputted from the computing device 300. For example, in various embodiments, the external device 310 may be embodied as one or more of the devices/systems described herein, and/or a portion thereof. Further, in some embodiments, the external device 310 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 310 may be integrated into the computing device 300.

The processing device 302 may be embodied as any type of processor(s) capable of performing the functions described herein. In particular, the processing device 302 may be embodied as one or more single or multi-core processors, microcontrollers, or other processor or processing/controlling circuits. For example, in some embodiments, the processing device 302 may include or be embodied as an arithmetic logic unit (ALU), central processing unit (CPU), digital signal processor (DSP), graphics processing unit (GPU), field-programmable gate array (FPGA), application-specific integrated circuit (ASIC), and/or another suitable processor(s). The processing device 302 may be a programmable type, a dedicated hardwired state machine, or a combination thereof. Processing devices 302 with multiple processing units may utilize distributed, pipelined, and/or parallel processing in various embodiments. Further, the processing device 302 may be dedicated to performance of just the operations described herein, or may be utilized in one or more additional applications. In the illustrative embodiment, the processing device 302 is programmable and executes algorithms and/or processes data in accordance with operating logic 308 as defined by programming instructions (such as software or firmware) stored in memory 306. Additionally, or alternatively, the operating logic 308 for processing device 302 may be at least partially defined by hardwired logic or other hardware. Further, the processing device 302 may include one or more components of any type suitable to process the signals received from input/output device 304 or from other components or devices and to provide desired output signals. Such components may include digital circuitry, analog circuitry, or a combination thereof.

The memory 306 may be of one or more types of non-transitory computer-readable media, such as a solid-state memory, electromagnetic memory, optical memory, or a combination thereof. Furthermore, the memory 306 may be volatile and/or nonvolatile and, in some embodiments, some or all of the memory 306 may be of a portable type, such as a disk, tape, memory stick, cartridge, and/or other suitable portable memory. In operation, the memory 306 may store various data and software used during operation of the computing device 300 such as operating systems, applications, programs, libraries, and drivers. It should be appreciated that the memory 306 may store data that is manipulated by the operating logic 308 of processing device 302, such as, for example, data representative of signals received from and/or sent to the input/output device 304 in addition to or in lieu of storing programming instructions defining operating logic 308. As shown in FIG. 3, the memory 306 may be included with the processing device 302 and/or coupled to the processing device 302 depending on the particular embodiment. For example, in some embodiments, the processing device 302, the memory 306, and/or other components of the computing device 300 may form a portion of a system-on-a-chip (SoC) and be incorporated on a single integrated circuit chip.

In some embodiments, various components of the computing device 300 (e.g., the processing device 302 and the memory 306) may be communicatively coupled via an input/output subsystem, which may be embodied as circuitry and/or components to facilitate input/output operations with the processing device 302, the memory 306, and other components of the computing device 300. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 300 may include other or additional components, such as those commonly found in a typical computing device (e.g., various input/output devices and/or other components), in other embodiments. It should be further appreciated that one or more of the components of the computing device 300 described herein may be distributed across multiple computing devices. In other words, the techniques described herein may be employed by a computing system that includes one or more computing devices. Additionally, although only a single processing device 302, I/O device 304, and memory 306 are illustratively shown in FIG. 3, it should be appreciated that a particular computing device 300 may include multiple processing devices 302, I/O devices 304, and/or memories 306 in other embodiments. Further, in some embodiments, more than one external device 310 may be in communication with the computing device 300.

The computing device 300 may be one of a plurality of devices connected by a network or connected to other systems/resources via a network. The network may be embodied as any one or more types of communication networks that are capable of facilitating communication between the various devices communicatively connected via the network. As such, the network may include one or more networks, routers, switches, access points, hubs, computers, client devices, endpoints, nodes, and/or other intervening network devices. For example, the network may be embodied as or otherwise include one or more cellular networks, telephone networks, local or wide area networks, publicly available global networks (e.g., the Internet), ad hoc networks, short-range communication links, or a combination thereof. In some embodiments, the network may include a circuit-switched voice or data network, a packet-switched voice or data network, and/or any other network able to carry voice and/or data. In particular, in some embodiments, the network may include Internet Protocol (IP)-based and/or asynchronous transfer mode (ATM)-based networks. In some embodiments, the network may handle voice traffic (e.g., via a Voice over IP (VOIP) network), web traffic, and/or other network traffic depending on the particular embodiment and/or devices of the system in communication with one another. In various embodiments, the network may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. It should be appreciated that the various devices/systems may communicate with one another via different networks depending on the source and/or destination devices/systems.

It should be appreciated that the computing device 300 may communicate with other computing devices 300 via any type of gateway or tunneling protocol such as secure socket layer or transport layer security. The network interface may include a built-in network adapter, such as a network interface card, suitable for interfacing the computing device to any type of network capable of performing the operations described herein. Further, the network environment may be a virtual network environment where the various network components are virtualized. For example, the various machines may be virtual machines implemented as a software-based computer running on a physical machine. The virtual machines may share the same operating system, or, in other embodiments, different operating system may be run on each virtual machine instance. For example, a "hypervisor" type of virtualizing is used where multiple virtual machines run on the same host physical machine, each acting as if it has its own dedicated box. Other types of virtualization may be employed in other embodiments, such as, for example, the network (e.g., via software defined networking) or functions (e.g., via network functions virtualization).

Accordingly, one or more of the computing devices 300 described herein may be embodied as, or form a portion of, one or more cloud-based systems. In cloud-based embodiments, the cloud-based system may be embodied as a server-ambiguous computing solution, for example, that executes a plurality of instructions on-demand, contains logic to execute instructions only when prompted by a particular activity/trigger, and does not consume computing resources when not in use. That is, system may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system described herein. For example, when an event occurs (e.g., data is transferred to the system for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user (e.g., via an appropriate user interface to the system), the appropriate virtual function(s) may be executed to perform the actions before eliminating the instance of the virtual function(s).

Figure 4:
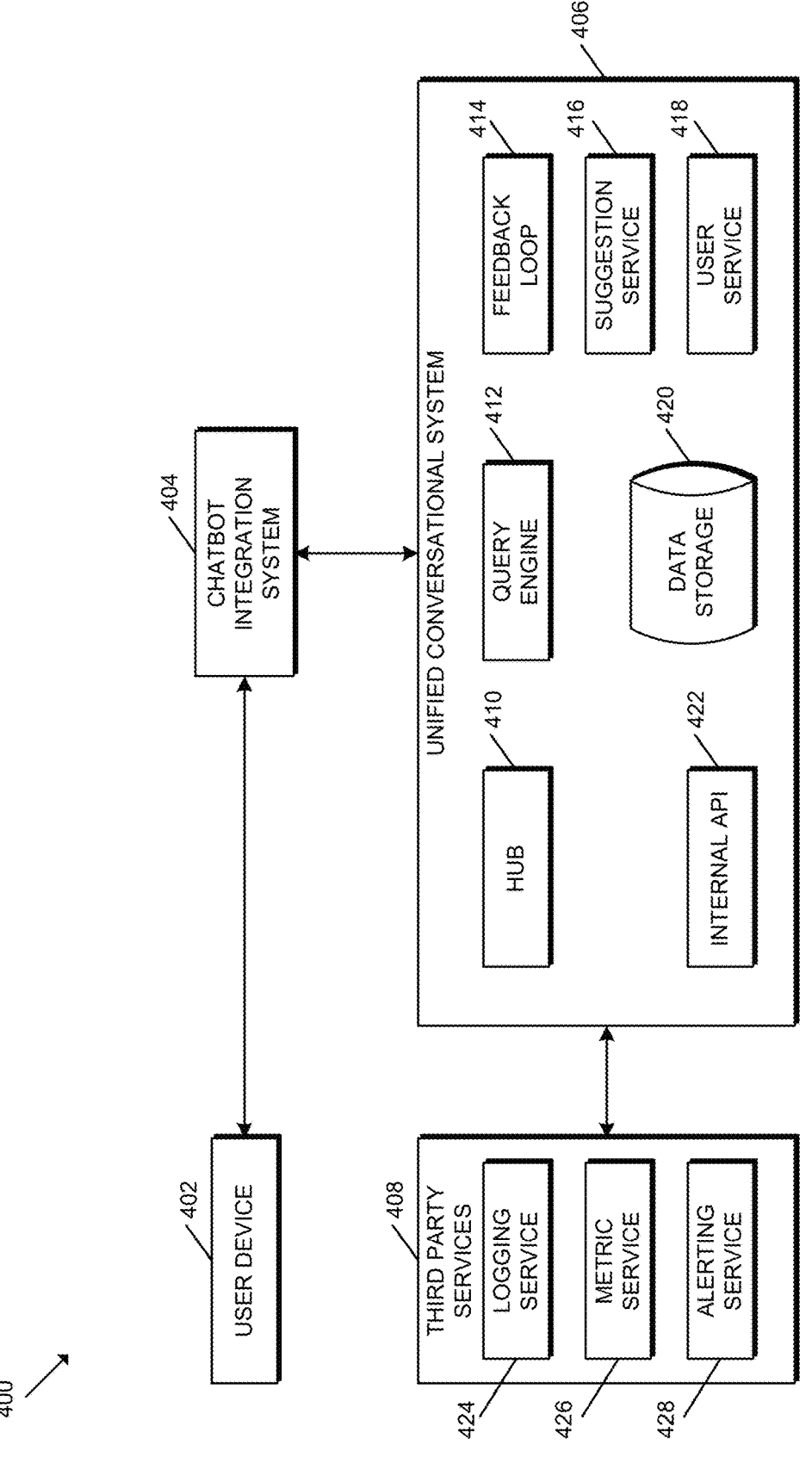
FIG. 4 is a simplified block diagram of at least one embodiment of an architecture for leveraging a unified conversational system.

Referring now to FIG. 4, a simplified embodiment of an architecture 400 for leveraging a unified conversational system depicts a user device 402, a chatbot integration system 404, a unified conversational system 406, and third party services 408. Additionally, the illustrative unified conversational system 406 depicts a hub 41, a query engine 412, a feedback loop 414, a suggestion service 416, a user service 418, a data storage 420, and an internal API 422, and the illustrative third party services 408 depict a logging service 424, a metric service 426, and an alerting service 428.

The chatbot integration system 404 integrates a chatbot (e.g., similar to the chatbot 218 of FIG. 2) with the unified conversational system 406 such that the chatbot can be deployed to a communicator platform, such as a platform with which the user is familiar. For example, in some embodiments, the chatbot may be registered with a respective applications portal. Once registered with any required authorization tokens and backend deployment-related data, the chatbot may be utilized by the user. For example, in various embodiments, the chatbot integration system 404 may integrate with a Teams app, Slack app, Skype bot framework, and/or another communicator platform, such that users on that respective platform can communicate with the unified conversational system 406 via the chatbot. Additionally, in the illustrative embodiment, the chatbot integration system 404 seamlessly integrates with one or more intent identification platforms (e.g., Google Dialog flow, Dialog Engine, etc.). Acting as a bridge between the chatbot and these external services, the chatbot integration system 404 processes user inputs from real-time chat conversations, employing natural language processing (NLP) techniques to identify underlying intents. In the illustrative embodiment, the chatbot integration system 404 not only discerns the user's purpose but also extracts specific keywords such as the environment where the application is deployed, the name of the metric or command that needs to be queried, and/or other supporting fields from the chatbot-user conversation, thereby enriching the understanding of the user's query.

The query engine 412 is configured to frame a query with any needed conditions and/or filters. In some embodiments, in order to do so, the query engine 412 receives the keywords generated from the intent identification of the chatbot integration system 404, which includes the command from which a query should be formed along with any supporting variables. For example, in some embodiments, the intent data may be received from the chatbot integration system 404 in JavaScript Object Notation (JSON) format, whereas in other embodiments, the intent data may be otherwise formatted. The query engine 412 interacts with a configuration service, which is a library of query templates grouped, for example, based on the engineering services that have made their service available for querying. The query engine 412 fetches the query template based on the command identified from the intent analysis. Each product may have configuration templates defined in the configuration service dedicated for the different DevOps services that the product is available in. It should be appreciated that the query templates may include queries for each use case with filters and conditions available as placeholders. The placeholders may be replaced by the query engine 412 with the parameters/keywords that are received from the intent analysis. The framed query may be sent to the hub 410, which may send the query as a payload to the respective API that is identified based on the query that is requested by the user.

The hub 410 is configured to function as a request/response processor and stands as a central interface within the unified conversational system 406 by orchestrating seamless interactions with the third party services 408 that are available in an engineering/technology ecosystem. The hub 410 is integrated with the APIs of the respective third party services 408, and it should be appreciated that each of the third party services 408 may serve a distinct purpose across the deployment, monitoring, and reporting of the system.

The third party services 408 may include one or more logging services 424, metric services 426, and/or alerting services 428 in various embodiments. For example, the logging services 424 may include application services such as Sumo logic, Kibana, and/or other logging application services. The metric services 426 may include application services such as Grafana, New Relic, and/or other metric application services. The alerting services 428 may include application services such as PagerDuty and/or other alerting application services. It should be further appreciated that the third party services 408 may include additional or alternative services in various embodiments. For example, in some embodiments, the third party services 408 may include deployment services such as GitHub workflows, Genesys Grandcentral, Helm pipeline, and/or other deployment application services. As described above, the integration is achieved by using the APIs and SDKs available for the various third party services 408. In the illustrative embodiment, the customized queries received from the query engine 412 may sent to the respective processor, which sends the query request and receives the query response. It should be appreciated that the query response received may be rendered in a format that is visually/graphically appealing to the user. For example, responses such as data points with several fields may be rendered as tables, and queries that provide dashboard panels as a response may be rendered as an image. It should be further appreciated that the query engine 412 and/or the hub 410 may interact with internal services of the cloud-based system 102 via one or more internal APIs 422 in a manner similar to integration with the third party services 408.

The user service 418 is configured to manage user profiles, which may be stored in the data storage 420. In the illustrative embodiment, the user service 418 may create and store a user profile based on the user interactions with the chatbot. For example, in some embodiments, the user service 418 may use Redis cache to store the user profile, which may be structured as a username as a key and a list of service names (e.g., three service names) as a value. The user profile may be generated when a user chooses a service name from a self-service menu or mentions a service name in a query (e.g., during a first interaction). At a subsequent interaction, the user profile may be fetched to provide a personalized experience to the user. For example, in some embodiments, a list of the services, commands, or queries most frequently referenced by the user may be provided to the user via a prompt. In other embodiments, the most recently referenced services, commands, or queries may be provided to the user via a prompt. Further, if a user chooses a different service for the query, the user service 418 may update the user profile to include the service name (if not already there).

The suggestion service 416 is configured to prepare a personalized prompt to the user based on the user's profile stored in the data storage 420. The personalized prompt may identify one or more query options related to one or more of the application services (e.g., the third party services 408 and/or the internal services). For example, in some embodiments, the user may be prompted (e.g., at the start of the chat) with a list of application services, commands, and/or queries from which to choose based on the user profile. In particular, in some embodiments, the chatbot may provide the five most recent searches for a particular application service (or five most recent searches/queries across all services). It should be appreciated that the user may select a different service, for example, by opting to discontinue with the self-service prompts or by posting a query (e.g., using natural language) related to something not covered by the personalized prompt.

The feedback loop 414 is configured to provide feedback to an application service owner/manager if queries not covered by the associated query file are asked. For example, in some embodiments, the feedback loop 414 monitors queries made by the various users and generates a notification (e.g., to the service owner) if a particular query has been made a least a threshold number of times to a particular application service for which no data is stored in the associated query file. In other words, in some circumstances, the chatbot may be unable to resolve a particular query, because the associated query file does not include a template or other data for generating a suitable response. If those circumstances occur frequently (e.g., at least some predefined threshold number of time), the feedback loop 414 may generate a notification so that the corresponding query can be added to the query file along with the relevant response information. In some embodiments, the frequency count of the query may be stored in the data storage 420. In some embodiments, a mailer script may trigger an electronic mail alert message to be generated and transmitted to the relevant party.

Referring now to FIG. 5, in use, a computing system (e.g., the system 100, the cloud-based system 102, the unified conversational system 112, 224, 406, and/or other computing devices described herein) may execute a method 500 for leveraging a unified conversational system. For simplicity and brevity of the description, references may be made individually to one of the unified conversational system 112, the unified conversational system 224, or the unified conversational system 406; however, such descriptions are intended to apply equally to each of the unified conversational systems 112, 224, 406 unless described explicitly to the contrary. It should be appreciated that the particular blocks of the method 500 are illustrated by way of example, and such blocks may be combined or divided, added or removed, and/or reordered in whole or in part depending on the particular embodiment, unless stated to the contrary. It should be further appreciated that the method 500 of FIG. 5 assumes that a user has begun a conversation with a chatbot of the unified conversational system 406.

The illustrative method 500 begins with block 502 in which the computing system (e.g., the unified conversational system 406) determines whether a user profile is stored for the user. More specifically, in some embodiments, the computing system determines whether any data is stored in association with the user's preferences, past search/query history, computing system parameters, software implementation parameters, and/or other query-relevant characteristics. If a user profile is not stored for the user (or there is insufficient data), the method 500 advances to block 508. Otherwise, the method 500 advances to block 504 in which the computing system retrieves the user profile or data therefrom. In block 506, the computing system provides a personalized prompt to the user based on the user profile. As described above, the personalized prompt may identify one or more query options related to one or more application services (e.g., third party services or internal services).

In block 508, the computing system receives a query statement from the user. For example, in some embodiments, the user may select a prompt option provided by the chatbot, whereas in other embodiments, the user may provide a text-based natural language query to the chatbot. In block 510, the computing system determines an intent of the query statement received from the user. For example, as described above, the computing system may leverage one or more intent identification systems.

In block 512, the computing system prepares a query for an application service associated with or otherwise relevant to the user's query statement via an API of the application service. In doing so, in block 514, the computing system retrieves a query template based on the intent as described above. It should be appreciated that the application service may be a third party service or an internal service depending on the particular query statement. In block 516, the computing system sends the prepared query to the application service via the API, and in block 518, the computing system receives a query response from the application service. In block 520, the computing system formats and provides the query response to the user. For example, depending on the character of the query response, the query response may be provided by the chatbot textually and/or graphically.

In block 522, the computing system determines whether to continue communication between the user and the chatbot. If so, the method 500 returns to block 508 in which the computing system (e.g., the chatbot) receives another query statement from the user.

Although the blocks 502-522 are described in a relatively serial manner, it should be appreciated that various blocks of the method 500 may be performed in parallel in some embodiments.

Referring now to FIGS. 6-10, various example interactions between a user and a chatbot that leverage a unified conversational system (e.g., the unified conversational system 112, 224, 406) are depicted.

Figure 6:
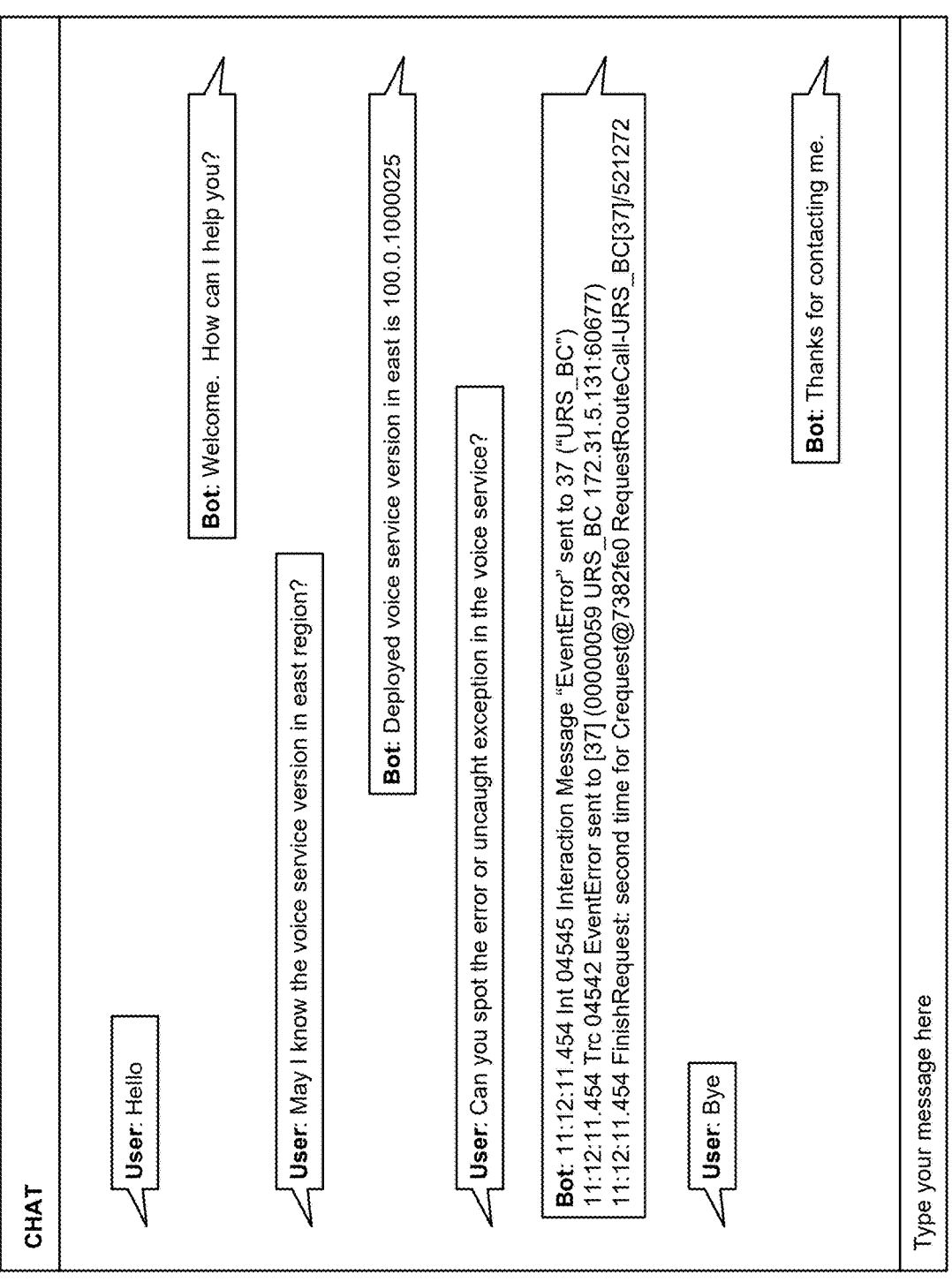
FIGS. 6-10 are examples of interactions between a user and a chatbot that leveraging a unified conversational system.

Referring specifically to FIG. 6, suppose there is an interaction between a user and a chatbot. The user and chatbot exchange greetings, and then the user sends a query statement asking for the "voice service version in east region." The unified conversational system 406 determines the intent and slot values of the query statement, prepares the query from the templates in the query file for the mapped service, and adds the associated application service to the user profile associated with the user. The unified conversational system 406 sends the query to the corresponding metric service via the respective API and receives the metrics in response. The chatbot sends a formatted query response including the metrics to the user. The user sends another query statement asking about a particular error in the voice service. The unified conversational system 406 determines the intent and slot values of the query statement and prepares the query from the templates in the query file for the mapped service. The unified conversational system 406 sends the query to the corresponding logging service via the respective API and receives the log data (e.g., log lines), for example, along with timestamps in response. The chatbot sends a formatted query response including the log data to the user.

Figure 7:
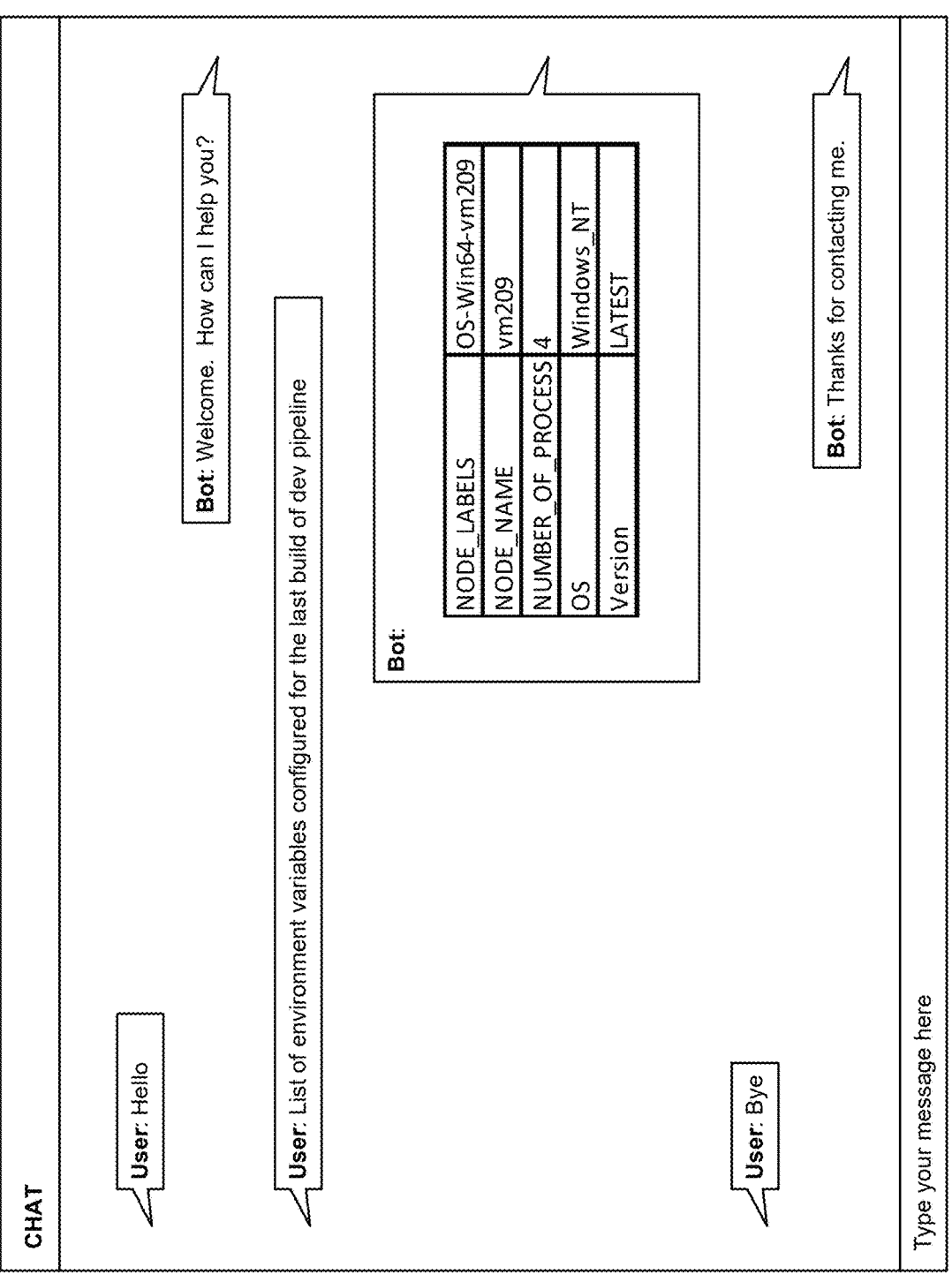

Referring specifically to FIG. 7, suppose there is an interaction between a user and a chatbot. The user and chatbot exchange greetings, and then the user sends a query statement asking for a list of "environment variables configured for the last build of dev pipeline." The unified conversational system 406 determines the intent and slot values of the query statement and prepares the query from the templates in the query file for the mapped service. The unified conversational system 406 sends the query to the corresponding internal application service via the respective API and receives the relevant data in response. The chatbot sends a formatted query response including the requested environment variables to the user.

Figure 8:
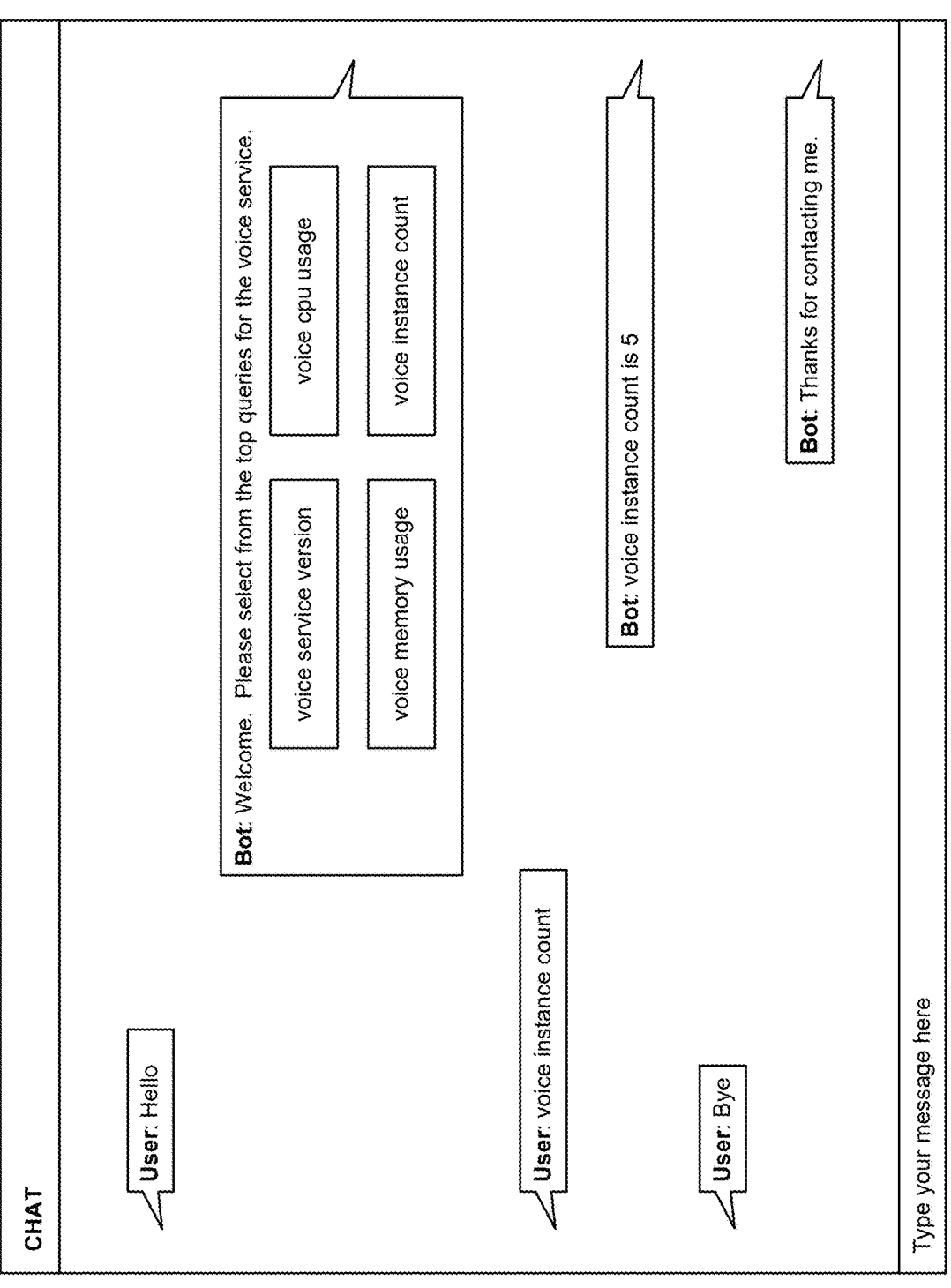

Referring specifically to FIG. 8, suppose there is an interaction between a user and a chatbot. The unified conversational system 406 determines that the user's profile is stored, analyzes the user profile (e.g., finding user-mapped services and/or queries), and prepares a personalized prompt. As shown, in the illustrative example, the personalized prompt is a personalized self-service menu including the top queries from the user profile. The user selects one of the options from the self-service menu by clicking the "voice instance count" query. The unified conversational system 406 determines the intent and slot values of the query statement and prepares the query from the templates in the query file for the mapped service. The unified conversational system 406 sends the query to the corresponding metric service via the respective API and receives the associated value for the "voice instance count" query in response. The chatbot sends a formatted query response including the voice instance count to the user.

Figure 9:
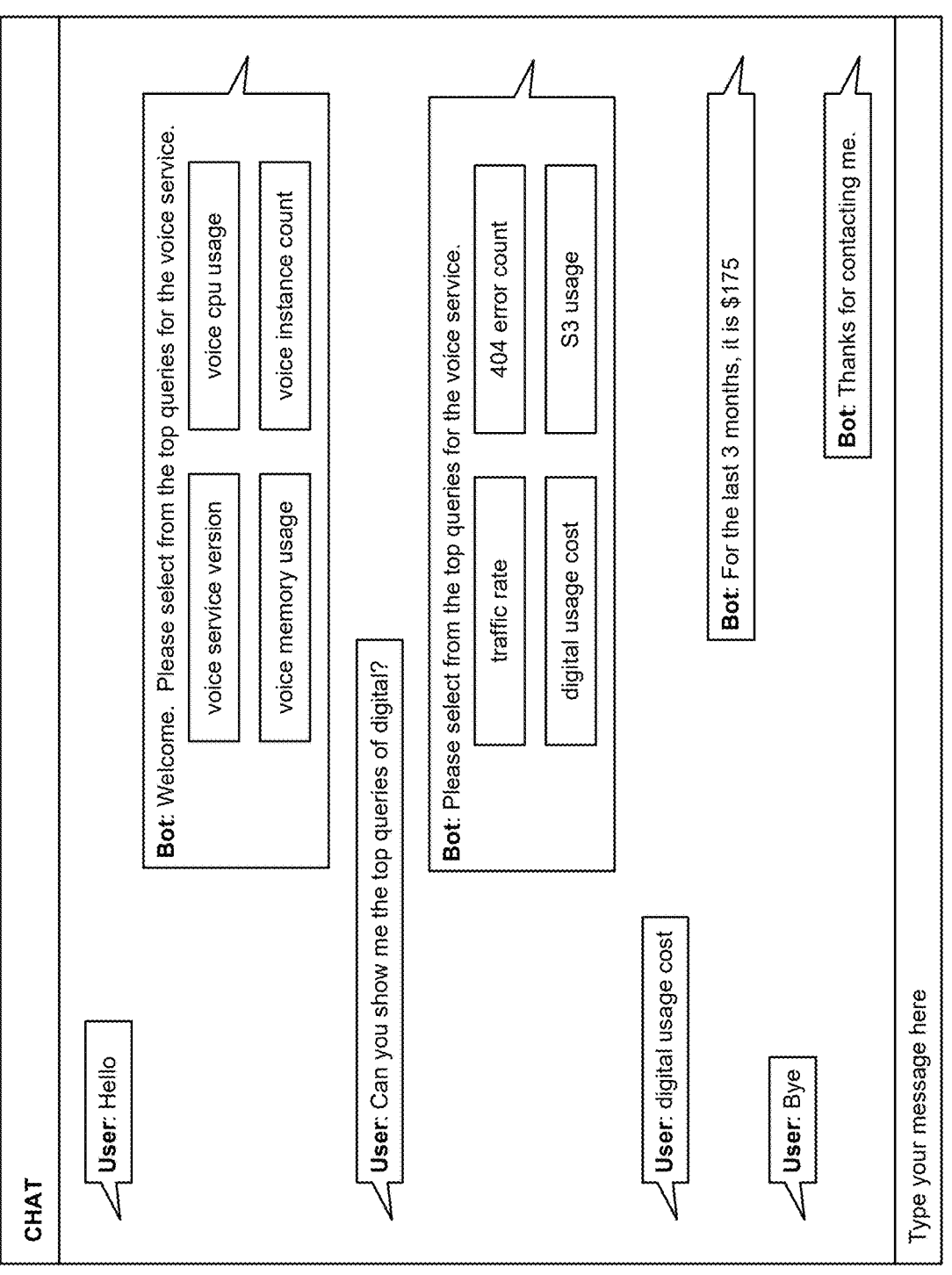

Referring specifically to FIG. 9, suppose there is an interaction between a user and a chatbot. The unified conversational system 406 determines that the user's profile is stored, analyzes the user profile (e.g., finding user-mapped services and/or queries), and prepares a personalized prompt. As shown, in the illustrative example, the personalized prompt is a personalized self-service menu including the top queries from the user profile. The user wants to proceed with a different service and/or query than those presented in the prompt, and therefore the user sends a different query statement asking for the "top queries of digital." The unified conversational system 406 adds that query/service to the user profile mapped service list and prepares a personalized self-service menu from the top queries of the newly added service, which is presented to the user. The user selects one of the options from the self-service menu by clicking the "digital usage cost" query. The unified conversational system 406 determines the intent and slot values of the query statement and prepares the query from the templates in the query file for the mapped service. The unified conversational system 406 sends the query to the corresponding metric service via the respective API and receives the associated value for the "digital usage cost" query in response. The chatbot sends a formatted query response including the digital usage cost to the user.

Figure 10:
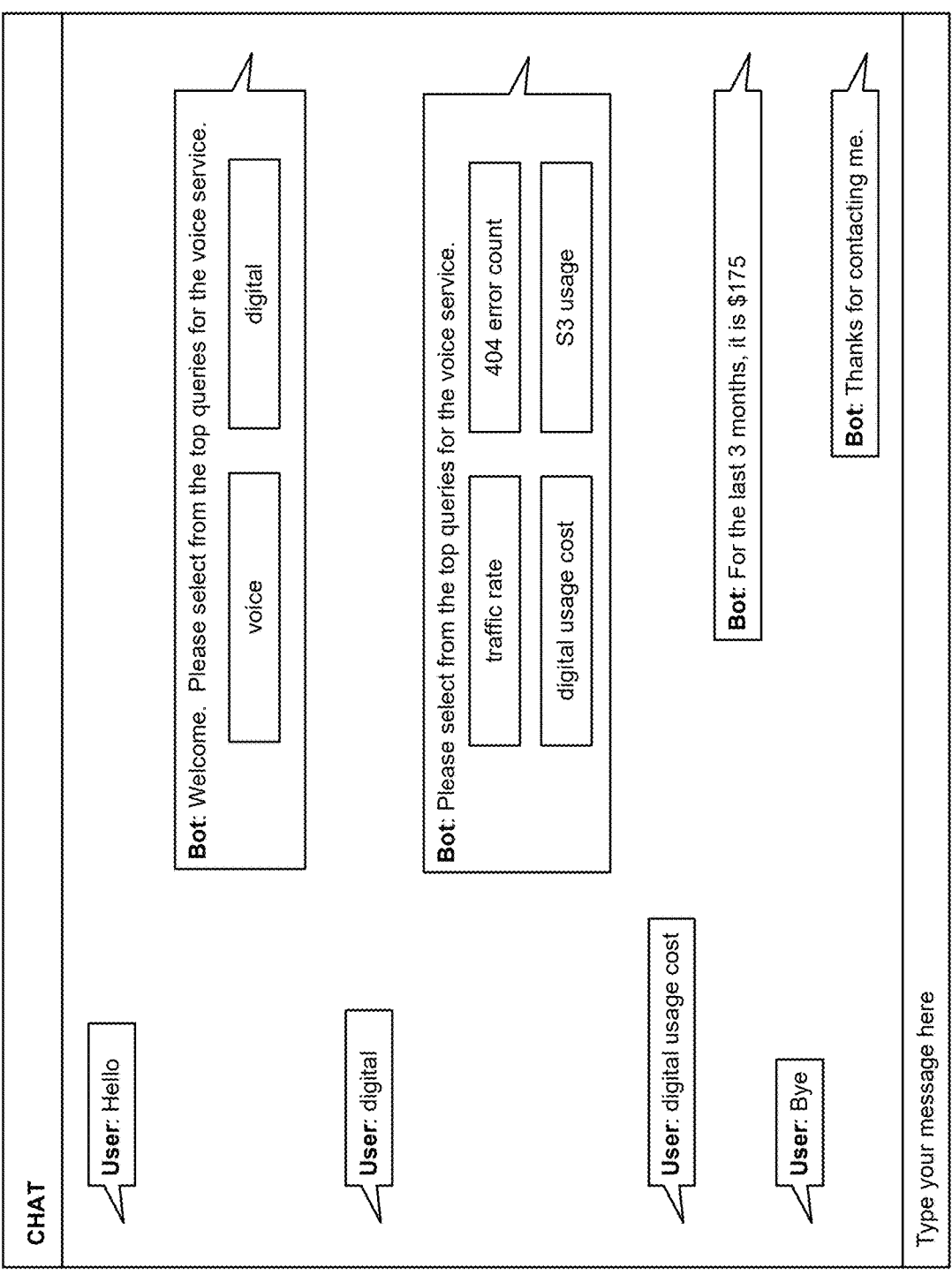

Referring specifically to FIG. 10, suppose there is an interaction between a user and a chatbot. The unified conversational system 406 determines that the user's profile is stored, analyzes the user profile (e.g., finding user-mapped services and/or queries), and prepares a personalized prompt. As shown, in the illustrative example, the personalized prompt is a personalized self-service menu including two services from which to select: voice and digital. The user opts to proceed with the "digital" service. The unified conversational system 406 adds the selection to the user profile mapped service list and prepares a personalized self-service menu from the top queries of the digital service, which is presented to the user. The user selects one of the options from the self-service menu by clicking the "digital usage cost" query. The unified conversational system 406 determines the intent and slot values of the query statement and prepares the query from the templates in the query file for the mapped service. The unified conversational system 406 sends the query to the corresponding metric service via the respective API and receives the associated value for the "digital usage cost" query in response. The chatbot sends a formatted query response including the digital usage cost to the user.

What is claimed is:

1. A method of leveraging a unified conversational system, the method comprising:

receiving, by the unified conversational system, a query statement from a user made to a chatbot;

determining, by the unified conversational system and with natural language processing, an intent of the query statement received from the user;

preparing, by the unified conversational system, a query for an application service that facilitates operations of a contact center system based on the intent of the query statement;

sending, by the unified conversational system, the query to the application service via an application programming interface (API) of the application service;

receiving, by the unified conversational system, a query response from the application service; and providing, by the unified conversational system, the query response to the user via the chatbot.

2. The method of claim 1, wherein preparing the query for the application service comprises retrieving a query template based on the intent of the query statement received from the user.

3. The method of claim 1, further comprising:

retrieving, by the unified conversational system, a user profile of the user; and providing, by the unified conversational system, a personalized prompt to the user based on the user profile, wherein the personalized prompt identifies one or more query options related to one or more application services.

4. The method of claim 3, wherein the user profile stores one or more application services frequently accessed by the user; and wherein the personalized prompt identifies data associated with the one or more application services frequently accessed by the user.

5. The method of claim 3, wherein the user profile stores a set of most recent queries by the user; and wherein the personalized prompt identifies the set of more recent queries by the user.

6. The method of claim 1, wherein the application service comprises a logging service.

7. The method of claim 1, wherein the application service comprises a metric service.

8. The method of claim 1, wherein the application service comprises an alerting service.

9. The method of claim 1, wherein the application service comprises a third party application service external to the unified conversational system.

10. The method of claim 1, further comprising generating, by the unified conversational system, a notification in response to determining that a particular query has been made at least a threshold number of times to a particular application service for which no data is stored in an associated query file.

11. A computing system for leveraging a unified conversational system, the computing system comprising:

at least one processor; and at least one memory having a plurality of instructions stored thereon that, in response to execution by the at least one processor, causes the computing system to:

receive, by the unified conversational system, a query statement from a user made to a chatbot;

determine, by the unified conversational system and with natural language processing, an intent of the query statement received from the user;

prepare, by the unified conversational system, a query for an application service that facilitates operations of a contact center system based on the intent of the query statement;

send, by the unified conversational system, the query to the application service via an application programming interface (API) of the application service;

receive, by the unified conversational system, a query response from the application service; and provide, by the unified conversational system, the query response to the user via the chatbot.

12. The computing system of claim 11, wherein to prepare the query for the application service comprises to retrieve a query template based on the intent of the query statement received from the user.

13. The computing system of claim 11, wherein the plurality of instructions further causes the computing system to:

retrieve, by the unified conversational system, a user profile of the user; and provide, by the unified conversational system, a personalized prompt to the user based on the user profile, wherein the personalized prompt identifies one or more query options related to one or more application services.

14. The computing system of claim 13, wherein the user profile stores one or more application services frequently accessed by the user; and wherein the personalized prompt identifies data associated with the one or more application services frequently accessed by the user.

15. The computing system of claim 13, wherein the user profile stores a set of most recent queries by the user; and wherein the personalized prompt identifies the set of more recent queries by the user.

16. The computing system of claim 11, wherein the application service comprises a logging service.

17. The computing system of claim 11, wherein the application service comprises a metric service.

18. The computing system of claim 11, wherein the application service comprises an alerting service.

19. The computing system of claim 11, wherein the application service comprises a third party application service external to the unified conversational system.

20. The computing system of claim 11, wherein the plurality of instructions further causes the computing system to generate, by the unified conversational system, a notification in response to a determination that a particular query has been made at least a threshold number of times to a particular application service for which no data is stored in an associated query file.

* * * * *